(12) United States Patent
Kim et al.

(10) Patent No.: US 8,542,935 B2
(45) Date of Patent: Sep. 24, 2013

(54) HYBRID PREDICTION APPARATUS AND METHOD FOR ENTROPY ENCODING

(75) Inventors: Kyeongpyo Kim, Daejeon (KR); Woo Yong Lee, Daejeon (KR); Young Ro Kim, Seoul (KR); HyunSang Park, Chungcheongnam-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 385 days.

(21) Appl. No.: 12/953,163

(22) Filed: Nov. 23, 2010

(65) Prior Publication Data
US 2011/0129161 A1 Jun. 2, 2011

(30) Foreign Application Priority Data
Nov. 30, 2009 (KR) .................. 10-2009-0116790

(51) Int. Cl.
*G06K 9/36* (2006.01)

(52) U.S. Cl.
USPC ........... 382/238; 382/232; 382/233; 382/244; 382/250; 382/251; 375/240.16; 375/240.17

(58) Field of Classification Search
USPC ................ 382/232, 233, 238, 237, 244, 250, 382/251, 253; 358/426.01, 426.09, 426.11; 348/394, 409.1, 411.1, 412.1, 413.1, 415.1
See application file for complete search history.

(56) References Cited

U.S. PATENT DOCUMENTS

| | | | | |
|---|---|---|---|---|
| 5,903,676 A | * | 5/1999 | Wu et al. ...................... | 382/244 |
| 6,137,837 A | * | 10/2000 | Nemiroff et al. ........ | 375/240.16 |
| 6,275,532 B1 | * | 8/2001 | Hibi et al. ................. | 375/240.17 |
| 7,602,848 B2 | * | 10/2009 | Panusopone ............. | 375/240.16 |
| 2006/0120450 A1 | | 6/2006 | Han et al. | |
| 2006/0251330 A1 | | 11/2006 | Toth et al. | |

FOREIGN PATENT DOCUMENTS

| | | |
|---|---|---|
| KR | 2006-0027795 A | 3/2006 |
| KR | 100679031 A | 1/2007 |

* cited by examiner

*Primary Examiner* — Ali Bayat
(74) *Attorney, Agent, or Firm* — Rabin & Berdo, P.C.

(57) ABSTRACT

Provided are a hybrid prediction apparatus and method for entropy encoding that may enhance an existing image compression scheme and prediction scheme by including and selectively using a plurality of predictors configured to perform a per-pixel prediction of an image frame, and may also supplement a performance of a prediction scheme, excessively occurring in a particular pixel.

10 Claims, 5 Drawing Sheets

FIG. 2

$C_{PredictorA\,i,j}$

| i \ j | 1 | 2 | 3 | 4 | 5 | 6 | 7 |
|---|---|---|---|---|---|---|---|
| 1 | 64 | 1683 | 474 | 3077 | 2908 | 10016 | 36658 |
| 2 | 30 | 1546 | 386 | 2468 | 3021 | 11853 | 31960 |
| 3 | 49 | 1496 | 508 | 2828 | 3679 | 8326 | 25625 |

FIG. 3

$C_{PredictorB_{i,j}}$

| i \ j | 1 | 2 | 3 | 4 | 5 | 6 | 7 |
|---|---|---|---|---|---|---|---|
| 1 | 62 | 1663 | 450 | 4192 | 4039 | 11246 | 43857 |
| 2 | 30 | 1555 | 303 | 3345 | 4391 | 15604 | 43662 |
| 3 | 47 | 805 | 585 | 3387 | 3662 | 10273 | 32889 |

HYBRID PREDICTION APPARATUS AND METHOD FOR ENTROPY ENCODING

CROSS-REFERENCE TO RELATED APPLICATION

This application claims the benefit of Korean Patent Application No. 10-2009-0116790, filed on Nov. 30, 2009, in the Korean Intellectual Property Office, the disclosure of which is incorporated herein by reference.

BACKGROUND

1. Field of the Invention

The present invention relates to a hybrid prediction apparatus and method for entropy to encoding, and more particularly, to a hybrid prediction apparatus and method that may include and selectively a plurality of predictors to perform a per-pixel prediction with respect to an image frame.

2. Description of the Related Art

Generally, an entropy encoding scheme indicates a scheme that may perform a prediction using a correlation between pixels of an image, and may encode a difference between the pixels of the image.

In the case of a conventional entropy encoding scheme, an H.264 standard of the International Telecommunication Union Telecommunication Standardization Sector (ITU-T)-affiliated Video Coding Expert Group (VCEG), a Moving Picture Expert Group (MPEG)-4 part10 Advanced Video Coding (AVC) standard of the International Organization for Standardization/International Electrotechnical Commission (ISO/IEC)-affiliated MPEG, and the like have been proposed as standards for a video compression scheme.

The video compression scheme may be configured as a Context Adaptive Variable Length Coding (CAVLC) scheme, a Context Adaptive Binary Arithmetic Coding (CABAC) scheme, and the like.

However, a substantially compressed image may have a different compressibility according to a performance of a predictor used for each compression scheme and a corresponding configuration scheme. The predictor may cause an excessive prediction error according to a type of the predictor or a characteristic of the predictor.

SUMMARY

An aspect of the present invention provides a hybrid prediction apparatus and method for entropy encoding that may enhance an existing image compression scheme and prediction scheme by including and selectively using a plurality of predictors configured to perform a per-pixel prediction of an image frame.

Another aspect of the present invention also provides a hybrid prediction apparatus and method for entropy encoding that may supplement a performance of a used prediction scheme by comparing and analyzing prediction patterns with respect to the same pixel, and thereby using a prediction pattern having a relatively small amount of errors.

According to an aspect of the present invention, there is provided a hybrid prediction apparatus for entropy encoding, the apparatus including: at least two predictors, each to output a prediction pattern with respect to an input image frame using a correlation between pixels of the image frame; a selection processor to acquire per-pixel errors of prediction patterns output by the at least two predictors, and to thereby select, from among the output prediction patterns, a prediction pattern having a relatively small amount of errors; and an entropy coder to perform entropy encoding of the selected prediction pattern.

Each of the at least two predictors may output the prediction pattern of the image frame using a median edge detector (MED) scheme or a gradient-adjusted predictor (GAP) scheme.

The per-pixel error may correspond to a sum of an absolute difference (SAD) between a prediction value of each pixel and an actual pixel value.

The selection processor may include: a counting unit to count a predetermined value through a comparison for the at least two predictors by acquiring the per-pixel errors of the prediction patterns; and a selector to select the prediction pattern having the relatively small amount of errors from among prediction patterns with respect to the same pixel, using a counting result of the counting unit.

The counting unit may compare the per-pixel errors of the prediction patterns output by the at least two predictors to increase a count value of a prediction pattern of a predictor having a relatively small per-pixel error.

According to another aspect of the present invention, there is provided a hybrid prediction method of a hybrid prediction apparatus including at least two predictors, the method including: predicting, by each of the at least two predictors, a prediction pattern with respect to an input image frame using a correlation between pixels of the image frame; analyzing per-pixel errors of output prediction patterns to select, from among the output prediction patterns, a prediction pattern having a relatively small amount of errors; and performing entropy encoding of the image frame using the selected prediction pattern.

The predicting may include outputting the prediction pattern of the image frame using a MED scheme or a GAP scheme.

The per-pixel error corresponds to a sum of an SAD between a prediction value of each pixel and an actual pixel value.

The analyzing and the selecting may include: counting a predetermined value through a comparison for the at least two predictors by acquiring the per-pixel errors of the prediction patterns; and selecting the prediction pattern having the relatively small amount of errors from among prediction patterns with respect to the same pixel, using the count value.

The counting may include comparing the per-pixel errors of the prediction patterns output by the at least two predictors to increase a count value of a prediction pattern of a predictor having a relatively small per-pixel error.

Effect

According to embodiments of the present invention, even though an excessive prediction error occurs due to a particular pixel or a particular pattern when compressing an image, it is possible to achieve a mutual supplementation by employing a prediction pattern according to a different prediction scheme.

Also, according to embodiments of the present invention, it is possible to effectively compress an image and to reduce a capacity of the compressed image by selectively using a plurality of compression schemes.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a diagram illustrating an example of a count value of a first predictor of FIG. 1;

FIG. 3 is a diagram illustrating an example of a count value of a second predictor of FIG. 1;

DETAILED DESCRIPTION

Figure 1:
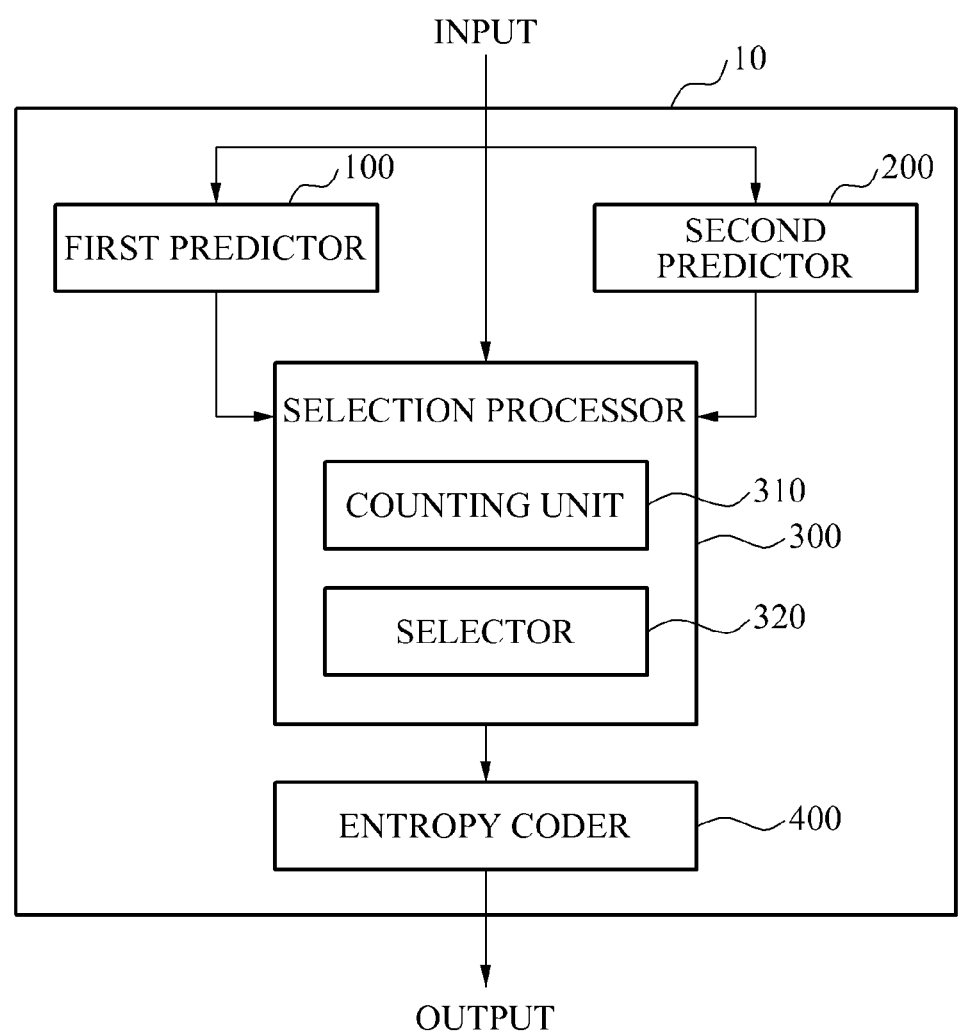
FIG. 1 is a block diagram illustrating a configuration of a hybrid prediction apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here.

Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 is a block diagram illustrating a configuration of a hybrid prediction apparatus 10 according to an embodiment of the present invention.

Referring to FIG. 1, the hybrid prediction apparatus 10 may include a first predictor 100, a second predictor 200, a selection processor 300, and an entropy coder 400.

When a predetermined image frame is input, each of the first predictor 100 and the second predictor 200 may output a prediction pattern using a correlation between pixels of the image frame.

In the case of the first predictor 100 and the second predictor 200, at least two predictors may be provided and thereby employ different compression schemes. In the present embodiment, it is assumed that the first predictor 100 employs a median edge detector (MED) scheme of predicting a pixel value of the image frame and outputting three prediction patterns, and the second predictor 200 employs a gradient-adjusted predictor (GAP) scheme of predicting the pixel value of the image frame and outputting seven prediction patterns.

Each of the first predictor 100 and the second predictor 200 may predict a pixel value of each location with respect to the image frame, using adjacent pixels of a corresponding pixel.

The selection processor 300 may acquire per-pixel errors of prediction patterns output by the first predictor 100 and the second predictor 200, and thereby select, from among the output prediction patterns, a prediction pattern having a relatively small amount of errors.

For the above operation, the selection processor 300 may include a counting unit 310 and a selector 320.

The counting unit 310 may count a predetermined value through a comparison for the first predictor 100 and the second predictor 200 by acquiring the per-pixel errors of the prediction patterns output by the first predictor 100 and the second predictor 200.

The selector 320 may select the prediction pattern having the relatively small amount of errors from among prediction patterns with respect to the same pixel, using a counting result of the counting unit 310.

Here, the selector 320 may select one prediction pattern from the prediction patterns, for example, $\Omega=\{PredictorA_{i,j}, PredictorB_{i,j}\}$ output by the first predictor 100 and the second predictor 200, and may finally determine a prediction pattern $P_{i,j}$ according to the following Equation 1.

$$P_{i,j} = \underset{f_k \in \Omega}{\arg\max}\, C_k \qquad \text{[Equation 1]}$$

The counting unit 310 may compare the per-pixel errors of the prediction patterns with respect to the first predictor 100 and the second predictor 200, and may increase a count value $C_k$ of a prediction pattern corresponding to a predictor, for example, the first predictor 100 having a relatively small per-pixel error.

In this instance, the per-pixel error corresponds to a sum of an absolute difference (SAD) between a prediction value of each pixel and an actual pixel value.

Accordingly, the counting unit 310 may count a count value $C_{PredictorA_{i,j}}$ of each prediction pattern of the first predictor 100 and a count value $C_{PredictorB_{i,j}}$ of each prediction pattern of the second predictor 200 according to a procedure disclosed in the following Equation 2.

if($SAD_{PredictorA_{i,j}} < SAD_{PredictorB_{i,j}}$)$C_{PredictorA_{i,j}} = C_{PredictorA_{i,j}} + 1$;

elseif($SAD_{PredictorA_{i,j}} == SAD_{PredictorB_{i,j}}$)$\{C_{PredictorA_{i,j}} = C_{PredictorA_{i,j}} + 1$;

$C_{PredictorB_{i,j}} = C_{PredictorB_{i,j}} + 1;\}$ else $C\,PredictorB_{i,j} = C_{PredictorB_{i,j}} + 1$; [Equation 2]

The first predictor 100 employs the MED scheme of outputting three patterns and thus, may have prediction patterns of i={1, 2, 3}. Also, the second predictor 200 employs the GAP scheme of outputting seven patterns and thus, may have prediction patterns of j={1, 2, 3, 4, 5, 6, 7}.

FIG. 2 is a diagram illustrating an example of a count value for each prediction pattern of the first predictor 100 when the procedure of Equation 2 is performed, and FIG. 3 is a diagram illustrating an example of a count value for each prediction pattern of the second predictor 200 when the procedure of Equation 2 is performed.

In FIG. 2 and FIG. 3, the count value for each prediction pattern may be counted based on an amount of errors for each pixel according to the procedure of Equation 2. Accordingly, as the count value increases, a corresponding prediction pattern and a corresponding predictor may have a relatively small amount of errors.

Also, since the count value is processed by combining three patterns of the first predictor 100 and seven patterns of the second predictor 200, 21 count values may exist. The counting unit 310 may store the count value by using 21 bits for each frame of an image.

The selector 320 may select a prediction pattern having a relatively small amount of errors from among prediction patterns output by the first predictor 100 and the second predictor 200 with respect to the same pixel, using a counting result of the counting unit 310.

For example, when it is assumed that a prediction pattern of the first predictor 100 is i=1 and a prediction pattern of the second predictor 200 is j=3, the selector 320 may compare "474" corresponding to a case where i=1 and j=3 in FIG. 2 with "450" corresponding to a case where i=1 and j=3 in FIG. 3. Here, "474" indicates a count value of the prediction pattern of the first predictor 100, and "450" indicates a count value of the prediction pattern of the second predictor 200.

Accordingly, the selector 320 may select a prediction pattern having a relatively great count value and the corresponding predictor, that is, the first predictor 100 having "474".

The entropy coder 400 may perform entropy encoding using the prediction pattern selected by the selection processor 300.

The entropy coder 400 may enable compression of the image frame by encoding a difference between a pixel value of the selected prediction pattern and an actual pixel value. The entropy coder 400 may employ various entropy coding schemes.

Figure 4:
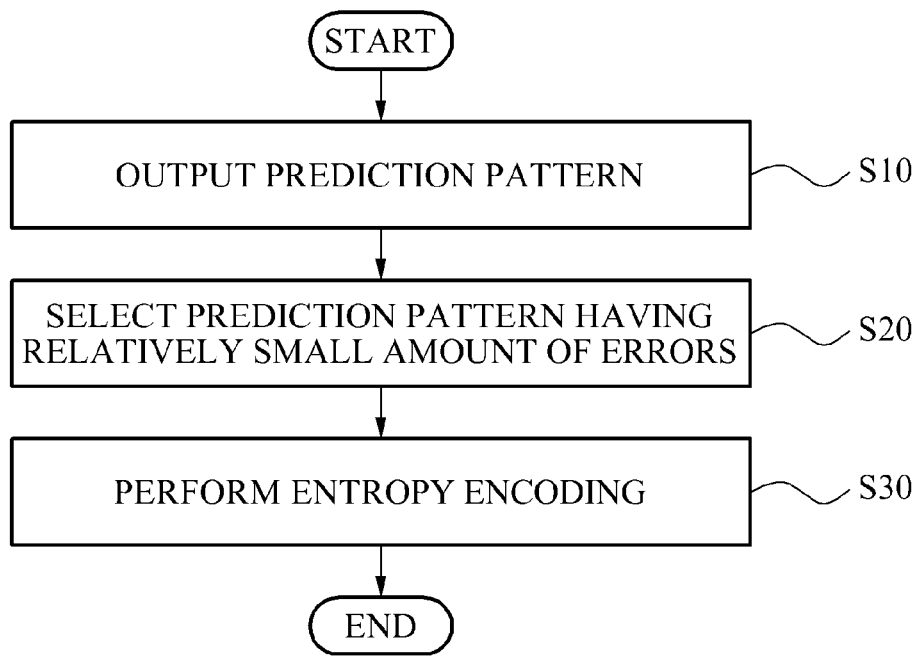
FIG. 4 is a flowchart illustrating an operation of a hybrid prediction apparatus according to an embodiment of the present invention.

FIG. 4 is a flowchart illustrating an operation of the hybrid prediction apparatus 10 according to an embodiment of the present invention.

Referring to FIG. 4, in operation S10, each of the first predictor 100 and the second predictor 200 may output a prediction pattern using a correlation between pixels of an image frame.

In operation S20, the selection processor 300 may select a prediction pattern having a relatively small amount of errors by analyzing a per-pixel error of each output prediction pattern.

In operation S30, the entropy coder 400 may perform entropy encoding of the image frame using the selected prediction pattern.

The hybrid prediction apparatus 10 may perform entropy encoding at a relatively high compressibility by selectively using prediction patterns of the image frame that are output according to various prediction schemes, for example, the MED scheme and the GAP scheme.

Figure 5:
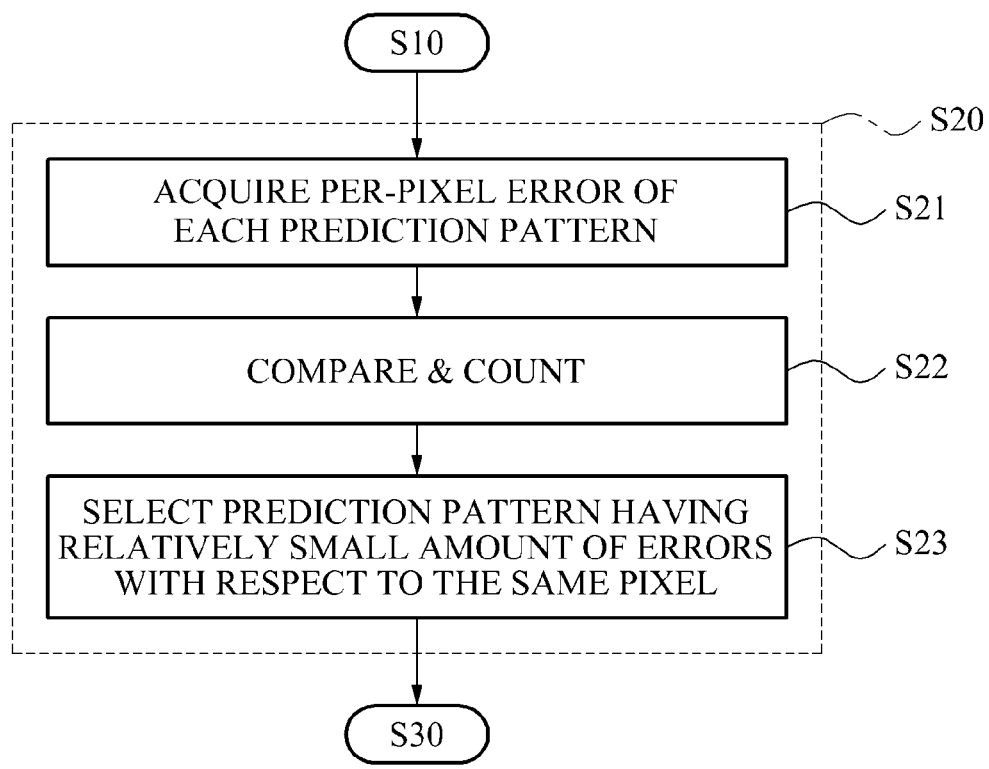
FIG. 5 is a flowchart illustrating a detailed process of selecting a prediction pattern of FIG. 4.

According to an embodiment of the present invention, operation S20 may include operations S21 through S23 of FIG. 5.

In operation S21, the counting unit 310 may acquire the per-pixel error of each prediction pattern output in operation S10 of FIG. 4.

In operation S22, the counting unit 310 may count a predetermined value by comparing the acquired per-pixel values for the first predictor 100 and the second predictor 200.

Here, the counting unit 310 may increase a count value of a prediction pattern corresponding to a prediction pattern, for example, the first predictor 100 having a relatively small per-pixel error according to the procedure of Equation 2.

In operation S23, the selector 320 may select a prediction pattern having a relatively small count value from among the prediction patterns output by the first predictor 100 and the second predictor 200 with respect to the same pixel, using the count value.

Accordingly, a hybrid prediction apparatus according to an embodiment of the present invention may supplement a particular pattern having a low compressibility by selecting, from among prediction patterns of the image frame, a prediction pattern having a relatively low count value with respect to the same pixel.

The above-described exemplary embodiments of the present invention may be recorded in computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A hybrid prediction apparatus for entropy encoding, the apparatus comprising:
   at least two predictors, each configured to output a plurality of prediction patterns with respect to an input image frame using correlations between pixels of the image frame;
   a selection processor to acquire per-pixel errors of all pixels of the image frame for each of the predictors with respect to all prediction pattern combinations, each prediction pattern combination including one of the plurality of prediction patterns output by each of the predictors, and to thereby select, from among all of the prediction pattern combinations for all of the predictors, one prediction pattern combination and one predictor that have a relatively small amount of per-pixel errors; and
   an entropy coder to perform entropy encoding of the selected prediction pattern combination.

2. The apparatus of claim 1, wherein the at least two predictors includes two predictors that respectively output the plurality of prediction patterns of the image frame using a median edge detector (MED) scheme and a gradient-adjusted predictor (GAP) scheme.

3. The apparatus of claim 1, wherein a per-pixel error for each of the pixels of the image frame corresponds to a sum of an absolute difference (SAD) between a prediction value of said each pixel and an actual pixel value of said each pixel.

4. The apparatus of claim 1, wherein the selection processor comprises:
   a counting unit to count a predetermined value through a comparison for the at least two predictors by acquiring the per-pixel errors of the prediction patterns; and
   a selector to select the prediction pattern having the relatively small amount of errors from among prediction patterns with respect to the same pixel, using a counting result of the counting unit.

5. The apparatus of claim 4, wherein the counting unit compares the per-pixel errors of the prediction patterns output by the at least two predictors to increase a count value of a prediction pattern of a predictor having a relatively small per-pixel error.

6. A hybrid prediction method of a hybrid prediction apparatus comprising at least two predictors, the method comprising:
   predicting, by each of the at least two predictors, a plurality of prediction patterns with respect to an input image frame using correlations between pixels of the image frame;
   analyzing per-pixel errors of all pixels of the image frame for each of the predictors with respect to all prediction pattern combinations, each prediction pattern combination including one of the plurality of prediction patterns output by each of the at least two predictors, and selecting, from among all of the prediction pattern combinations and all of the predictors, a prediction pattern combination and a predictor that have a relatively small amount of errors; and performing entropy encoding of the image frame using the selected prediction pattern combination.

7. The method of claim 6, wherein the predicting comprises outputting the prediction pattern of the image frame using a MED scheme and a GAP scheme.

8. The method of claim 6, wherein a per-pixel error for each of the pixels of the image frame corresponds to a sum of an SAD between a prediction value of said each pixel and an actual pixel value of said each pixel.

9. The method of claim 6, wherein the analyzing and the selecting comprises:

counting a predetermined value through a comparison for the at least two predictors by acquiring the per-pixel errors of the prediction patterns; and selecting the prediction pattern having the relatively small amount of errors from among prediction patterns with respect to the same pixel, using the count value.

10. The method of claim 8, wherein the counting comprises comparing the per-pixel errors of the prediction patterns output by the at least two predictors to increase a count value of a prediction pattern of a predictor having a relatively small per-pixel error.

* * * * *